United States Patent
Dorum

(10) Patent No.: US 11,624,629 B2
(45) Date of Patent: Apr. 11, 2023

(54) METHOD, APPARATUS, AND COMPUTER PROGRAM PRODUCT FOR GENERATING PARKING LOT GEOMETRY

(71) Applicant: HERE Global, B.V., Eindhoven (NL)

(72) Inventor: Ole Henry Dorum, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 139 days.

(21) Appl. No.: 16/827,968

(22) Filed: Mar. 24, 2020

(65) Prior Publication Data

US 2021/0302194 A1 Sep. 30, 2021

(51) Int. Cl.
*G01C 21/36* (2006.01)
*B60W 30/06* (2006.01)
*G01C 21/30* (2006.01)
*G01C 21/34* (2006.01)

(52) U.S. Cl.
CPC ......... *G01C 21/3685* (2013.01); *B60W 30/06* (2013.01); *G01C 21/30* (2013.01); *G01C 21/3446* (2013.01); *G01C 21/3476* (2013.01)

(58) Field of Classification Search
CPC G01C 21/3685; G01C 21/30; G01C 21/3446; G01C 21/3476; G01C 21/3822; G01C 21/3819; G01C 21/3841; G01C 21/32; G01C 21/3492; B60W 30/06
See application file for complete search history.

(56) References Cited

U.S. PATENT DOCUMENTS

| | | |
|---|---|---|
| 6,385,539 B1 | 5/2002 | Wilson et al. |
| 7,797,104 B2 | 9/2010 | Finn et al. |
| 9,273,976 B2 | 3/2016 | Davidson |
| 9,672,759 B2 | 6/2017 | Hofmann et al. |
| 9,857,191 B2 | 1/2018 | Mason et al. |
| 9,978,161 B2 | 5/2018 | Dorum |

(Continued)

FOREIGN PATENT DOCUMENTS

| | | |
|---|---|---|
| CN | 108 053 679 A | 5/2018 |
| EP | 3 104 120 A1 | 12/2016 |

OTHER PUBLICATIONS

Extended European Search Report for European Application No. 21164222.8 dated Jul. 29, 2021, 9 pages.

(Continued)

*Primary Examiner* — Russell Frejd
*Assistant Examiner* — Ana D Thomas
(74) *Attorney, Agent, or Firm* — Alston & Bird LLP

(57) ABSTRACT

A method is provided for the creation of parking lot geometry that can be used to provide guidance to a vehicle through the parking lot. Methods may include: generating a road network of a parking lot based on a plurality of probe data points; map matching the plurality of probe data points to road links of the parking lot; identifying parking lot accessor road links; identifying a building affinity link; identifying primary parking lot road links, where primary parking lot road links include at least one of a trajectory count, probe count, or average or median probe speed that is higher than a respective trajectory count, probe count, or average or median speed of non-primary parking lot road (Continued)

links; establishing a route from a parking lot accessor road link to the building affinity link; and providing for guidance of a vehicle along the route.

22 Claims, 5 Drawing Sheets

(56) References Cited

U.S. PATENT DOCUMENTS

| | | | |
|---|---|---|---|
| 10,001,378 | B2 | 6/2018 | Mund |
| 10,096,248 | B2 | 10/2018 | Penna et al. |
| 10,352,718 | B2 | 7/2019 | Wu et al. |
| 10,444,020 | B2 | 10/2019 | Dorum |
| 10,546,400 | B2 | 1/2020 | Dorum |
| 2009/0306881 | A1 | 12/2009 | Dolgov et al. |
| 2012/0116678 | A1 | 5/2012 | Witmer |
| 2013/0144525 | A1 | 6/2013 | Yang |
| 2013/0211699 | A1* | 8/2013 | Scharmann ............ G06F 17/00 701/117 |
| 2016/0356606 | A1 | 12/2016 | Dorum |
| 2016/0358349 | A1 | 12/2016 | Dorum |
| 2016/0364985 | A1* | 12/2016 | Penna .................. G08G 1/0962 |
| 2017/0294036 | A1 | 10/2017 | Dorum |
| 2018/0024564 | A1 | 1/2018 | Matsuda |
| 2018/0087922 | A1* | 3/2018 | Wu ...................... G09B 29/106 |
| 2018/0189578 | A1 | 7/2018 | Yang et al. |
| 2018/0364063 | A1 | 12/2018 | Dorum |
| 2020/0012284 | A1 | 1/2020 | Morita et al. |
| 2020/0239024 | A1* | 7/2020 | Srinivasan ........... G05D 1/0011 |
| 2021/0009111 | A1* | 1/2021 | Kang .................. G05D 1/0022 |

OTHER PUBLICATIONS

Extended European Search Report for European Application No. 21163913.3 dated Aug. 27, 2021, 8 pages.

Gao et al., "VeMap: Indoor Road Map Construction via Smartphone-based Vehicle Tracking", 2016 IEEE Global Communications Conference (GLOBECOM), (Dec. 4-8, 2016), 6 pages.

Agamennoni, G. et al., *Robust Inference of Principal Road Paths for Intelligent Transportation Systems*, IEEE Transactions on Intelligent Transportation Systems, vol. 12, No. 1 (Mar. 2011) 298-308.

Agamennoni, G. et al., *Technical Report: Inference of Principal Road Paths Using GPS Data*, The University of Sydney, Australian Center for Field Robotics: Sydney, Australia, 2010(Jun. 4, 2010) 1-23.

Biagioni, J. et al., *Inferring Road Maps From Global Positioning System Traces: Survey and Comparative Evaluation*, Department of Computer Science, University of Illinois at Chicago (Nov. 2011) 21 pages.

Deng, M. et al., *Generating Urban Road Intersection Models From Low-Frequency GPS Trajectory Data*, International Journal of Geographical Information Science, vol. 32, No. 12 (2018) 2337-2361.

Zheng, L. et al., *A High-Definition Road-Network Model for Self-Driving Vehicles*, International Journal of Geo-Information, 7, 417 (2018) 14 pages.

U.S. Appl. No. 16/827,886, filed Mar. 24, 2020, In re: Dorum, entitled: *Method, Apparatus, and Computer Program Product for Generating Turn Paths Through an Intersection.*

U.S. Appl. No. 16/827,945, filed Mar. 24, 2020, In re: Dorum et al., entitled *Method, Apparatus, and Computer Program Product for Generating Turn Paths Through an Intersection.*

U.S. Appl. No. 16/827,975, filed Mar. 24, 2020, In re: Dorum, entitled *Method, Apparatus, and Computer Program Product for Generating a Map of Road Links of a Parking Lot.*

Non-Final Office Action for U.S. Appl. No. 16/827,975 dated Nov. 23, 2021.

Ole Henry Dorum, "Deriving Double-Digitized Road Network Geometry from Probe Data", Proceedings of SIGSPATIAL '17, (Nov. 7-10, 2017), 10 pages.

Notice of Allowance for U.S. Appl. No. 16/827,975 dated Apr. 1, 2022.

\* cited by examiner

METHOD, APPARATUS, AND COMPUTER PROGRAM PRODUCT FOR GENERATING PARKING LOT GEOMETRY

TECHNOLOGICAL FIELD

An example embodiment of the present disclosure relates to the creation of parking lot geometry that can be used to provide guidance to a vehicle through the parking lot, and more particularly, to the automatic creation of parking lot geometry to enable guidance of vehicles to and from parking located proximate points-of-interest.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server. Digital maps can further be enhanced with dynamic information, such as traffic information in real time along roads and through intersections.

Autonomous and semi-autonomous vehicle control requires detailed information relating to roads along which vehicles will travel. Straight sections of road are considerably less complex than intersections of roads where numerous paths are available. Autonomous and semi-autonomous vehicle control requires awareness of all available paths to successfully and efficiently navigate through a region.

BRIEF SUMMARY

A method, apparatus, and computer program product are provided in accordance with an example embodiment for the creation of parking lot geometry that can be used to provide guidance to a vehicle through the parking lot, and more particularly, to the automatic creation of parking lot geometry to enable guidance of vehicles to and from parking located proximate points-of-interest. Embodiments provided herein include an apparatus having at least one processor and at least one memory including computer program code with the at least one memory and computer program code configured to, with the processor, cause the apparatus to: generate a road network of a parking lot based on a plurality of probe data points; map match the plurality of probe data points to road links of the parking lot; identify parking lot accessor road links; identify a building affinity link; identify primary parking lot road links, where primary parking lot road links include at least one of a trajectory count, probe count, or average or median probe speed that is higher than a respective trajectory count, probe count, or average or median probe speed of non-primary parking lot road links; establish a route from a parking lot accessor road link to the building affinity link, where the route that is established is based on a cost-based routing algorithm in which primary parking lot road links are of a lower cost than non-primary parking lot road links; and provide for guidance of a vehicle along the route.

According to some embodiments, causing the apparatus to map match the plurality of probe data points to road links of the parking lot includes causing the apparatus to map match the plurality of probe data points to road links of the parking lot based on at least one of probe density or number of trajectories. Inputs to the cost-based routing algorithm may include one or more of route length, number of turns, link probe speed, link probe density, link probe trajectory count, or heading variance. The apparatus may be caused to calculate a heading spread of trajectories along the parking lot road links, where causing the apparatus to identify primary parking lot road links includes causing the apparatus to identify primary parking lot road links as having a low heading variance relative to non-primary parking lot road links.

Causing the apparatus of some embodiments to identify the building affinity link may include causing the apparatus to: identify at least one of a building footprint or a point-of-interest location; determine the building affinity link as a road link of the parking lot proximate the at least one of the building footprint or the point-of-interest location; and establish the building affinity link as a routing destination for the at least one of the building footprint or the point-of-interest location. Causing the apparatus to provide for guidance of the vehicle along the route may include causing the apparatus to provide autonomous vehicle control of the vehicle along the route. The apparatus may be caused to establish a route from a parking location to a pick-up location; and provide autonomous vehicle control of the vehicle from the parking location to the pick-up location. The apparatus may be caused to store the road network of the parking lot in a map database.

Embodiments described herein may include a computer program product having at least one non-transitory computer-readable storage medium with computer-executable program code instructions stored therein with the computer-executable program code instructions including program code instructions to: generate a road network of a parking lot based on a plurality of probe data points; map match the plurality of probe data points to road links of the parking lot; identify parking lot accessor road links; identify a building affinity link; identify primary parking lot road links, where primary parking lot road links include at least one of a trajectory count, probe count, or average or median probe speed that is higher than a respective trajectory count, probe count, or average or median probe speed of non-primary parking lot road links; establish a route from a parking lot accessor road link to the building affinity link, where the route that is established is based on a cost-based routing algorithm in which primary parking lot road links are of a lower cost than non-primary parking lot road links; and provide for guidance of a vehicle along the route.

According to an example embodiment, the program code instructions to map match the plurality of probe data points to road links of the parking lot include program code instructions to: map match the plurality of probe data points to road links of the parking lot based on at least one of probe density or a number of trajectories. Inputs to the cost-based routing algorithm may include one or more of route length, number of turns, link probe speed, link probe density, link probe trajectory count, or heading variance. Embodiments may include program code instructions to calculate a heading spread of trajectories along the parking lot road links, where the program code instructions to identify primary parking lot road links further include program code instructions to identify primary parking lot road links as having a low heading variance relative to non-primary parking lot road links.

The program code instructions to identify the building affinity link may include program code instructions to: identify at least one of a building footprint or a point-of-interest location; determine the building affinity link as a road link of the parking lot proximate the at least one of the building footprint or the point-of-interest location; and establish the building affinity link as a routing destination for the at least one of the building footprint or the point-of-interest location. The program code instructions to provide for guidance of the vehicle along the route may include program code instructions to provide autonomous vehicle control of the vehicle along the route. Embodiments may include program code instructions to establish a route from a parking location to a pick-up location; and provide autonomous vehicle control of the vehicle from the parking location to the pick-up location. Embodiments may include program code instructions to store the road network of the parking lot in a map database.

Embodiments described herein may provide a method including: generating a road network of a parking lot based on a plurality of probe data points; map matching the plurality of probe data points to road links of the parking lot; identifying parking lot accessor road links; identifying a building affinity link; identifying primary parking lot road links, where primary parking lot road links include at least one of a trajectory count, probe count, or average or median probe speed that is higher than a respective trajectory count, probe count, or average or median speed of non-primary parking lot road links; establishing a route from a parking lot accessor road link to the building affinity link, where the route that is established is based on a cost-based routing algorithm in which primary parking lot road links are of a lower cost than non-primary parking lot road links; and providing for guidance of a vehicle along the route.

According to some embodiments, map matching the plurality of probe data points to road links of the parking lot may include map matching the plurality of probe data points to road links of the parking lot based on at least one of probe density or a number of trajectories. Inputs to the cost-based routing algorithm may include one or more of route length, number of turns, link probe speed, link probe density, link probe trajectory count, or heading variance. Embodiments may include calculating a heading spread of trajectories along the parking lot road links, where identifying primary parking lot road links includes identifying primary parking lot road links as having a low heading variance relative to non-primary parking lot road links. Identifying the building affinity link may include identifying at least one of a building footprint or a point-of-interest location; and establishing the building affinity link as a routing destination for the at least one of the building footprint or the point-of-interest location. Providing guidance of the vehicle along the route may include providing autonomous vehicle control of the vehicle along the route.

Embodiments described herein may provide an apparatus including: means, such as a processor or the like, for generating a road network of a parking lot based on a plurality of probe data points; means, such as a processor or the like, for map matching the plurality of probe data points to road links of the parking lot; means, such as a processor or the like, for identifying parking lot accessor road links; means, such as a processor or the like, for identifying a building affinity link; means, such as a processor or the like, for identifying primary parking lot road links, where primary parking lot road links include at least one of a trajectory count, probe count, or average or median probe speed that is higher than a respective trajectory count, probe count, or average or median speed of non-primary parking lot road links; means, such as a processor or the like, for establishing a route from a parking lot accessor road link to the building affinity link, where the route that is established is based on a cost-based routing algorithm in which primary parking lot road links are of a lower cost than non-primary parking lot road links; and means, such as a processor, a user interface, or the like, for providing for guidance of a vehicle along the route.

According to some embodiments, the means for map matching the plurality of probe data points to road links of the parking lot may include means, such as a processor or the like, for map matching the plurality of probe data points to road links of the parking lot based on at least one of probe density or a number of trajectories. Inputs to the cost-based routing algorithm may include one or more of route length, number of turns, link probe speed, link probe density, link probe trajectory count, or heading variance. Embodiments may include means, such as a processor or the like, for calculating a heading spread of trajectories along the parking lot road links, where the means for identifying primary parking lot road links includes means for identifying primary parking lot road links as having a low heading variance relative to non-primary parking lot road links. The means for identifying the building affinity link may include: means, such as a processor or the like, for identifying at least one of a building footprint or a point-of-interest location; and means, such as a processor or the like, for establishing the building affinity link as a routing destination for the at least one of the building footprint or the point-of-interest location. The means for providing guidance of the vehicle along the route may include means, such as a processor or the like, for providing autonomous vehicle control of the vehicle along the route.

BRIEF DESCRIPTION OF THE DRAWINGS

Figure 1:
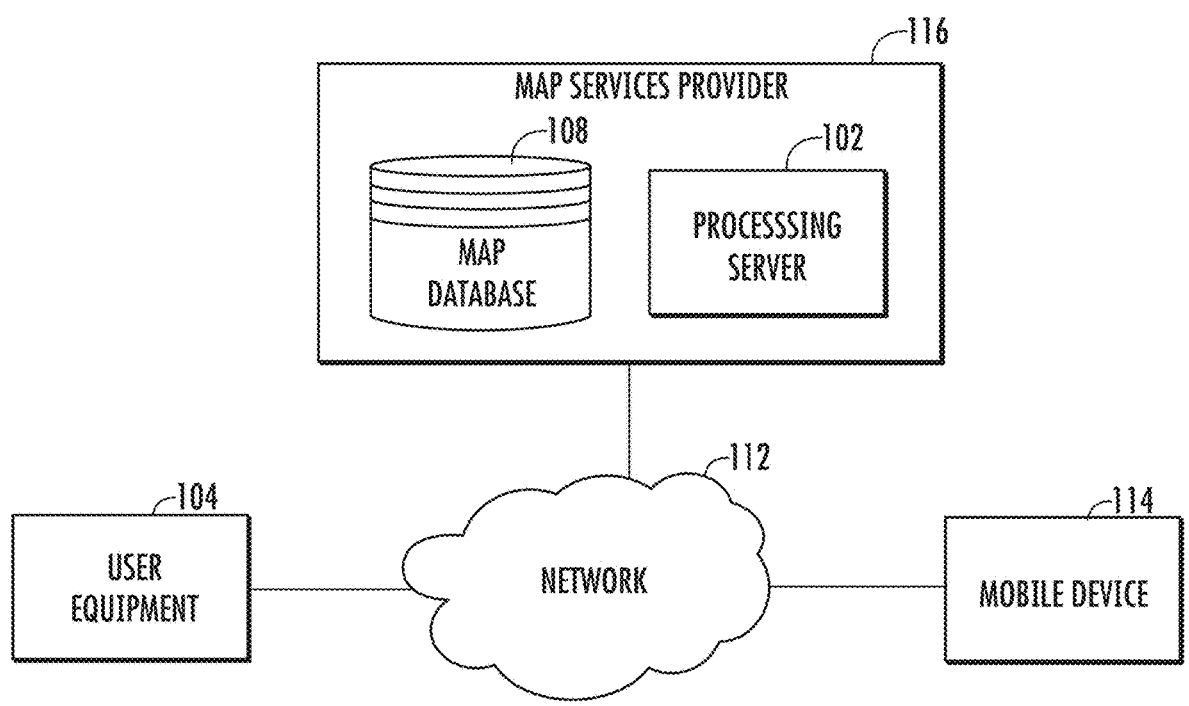
Figure 2:
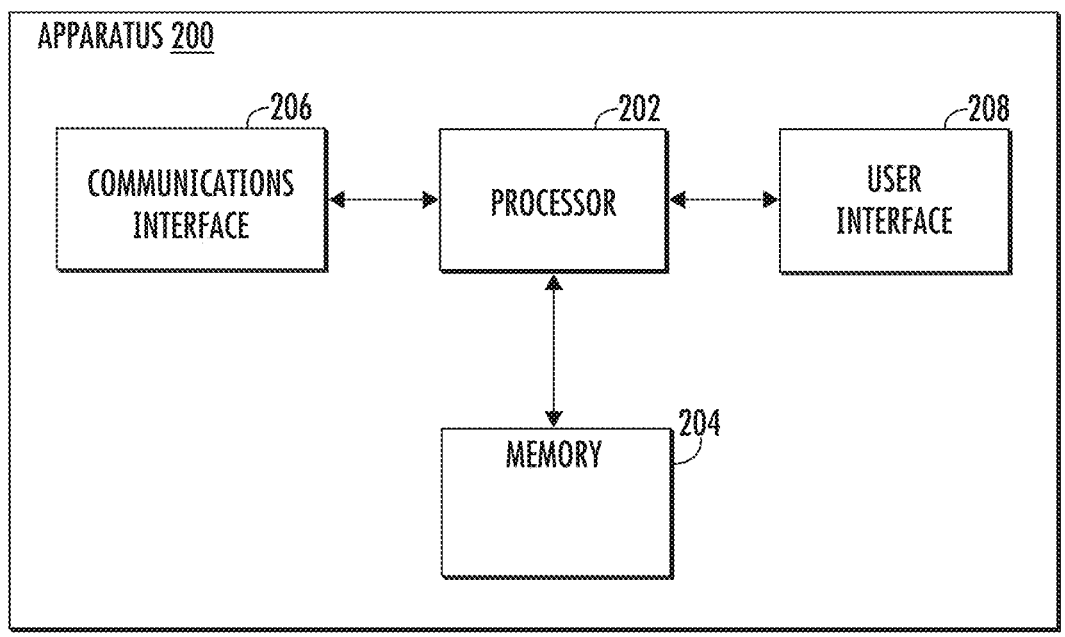
Figure 3:
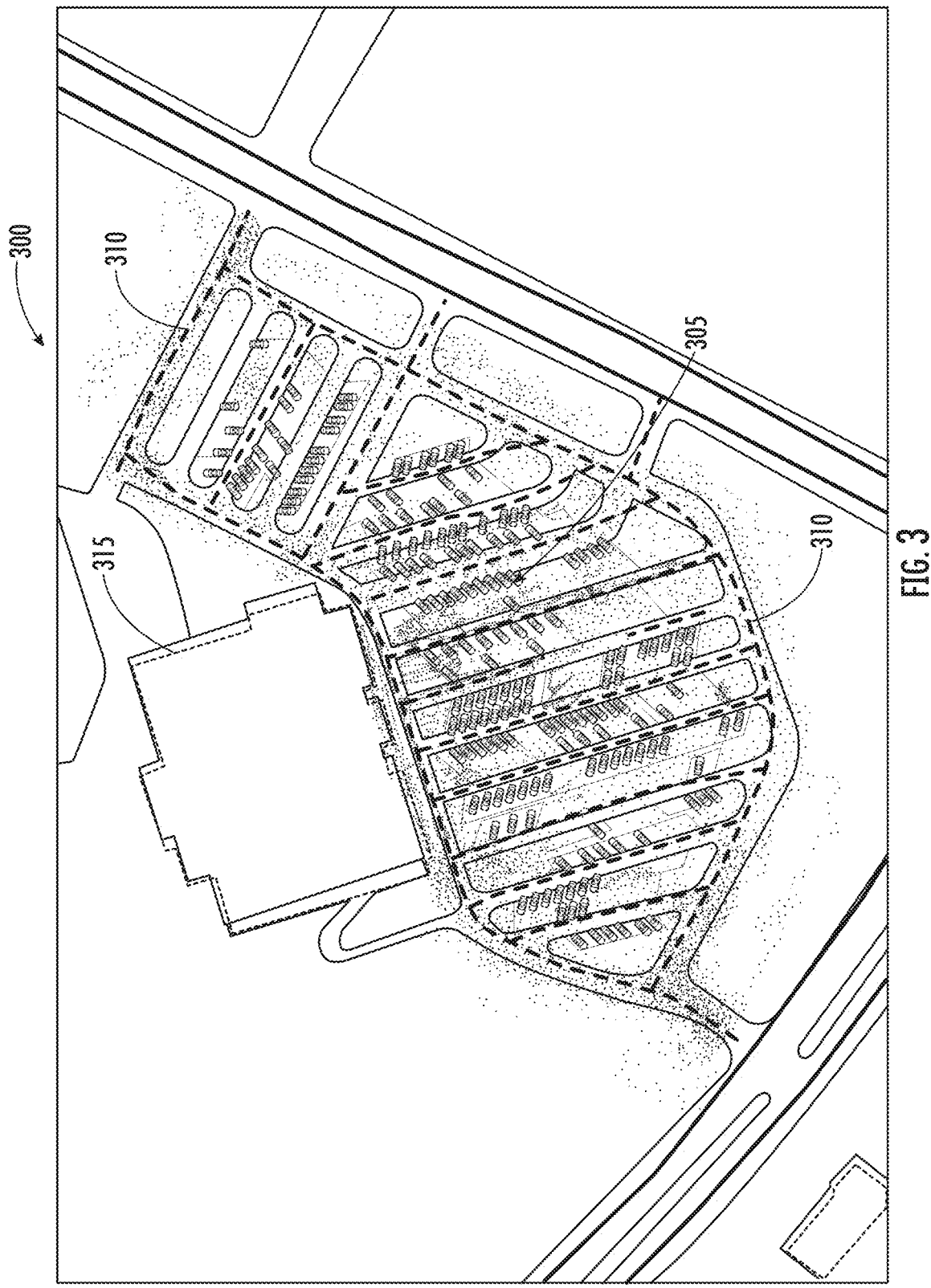
Figure 4:
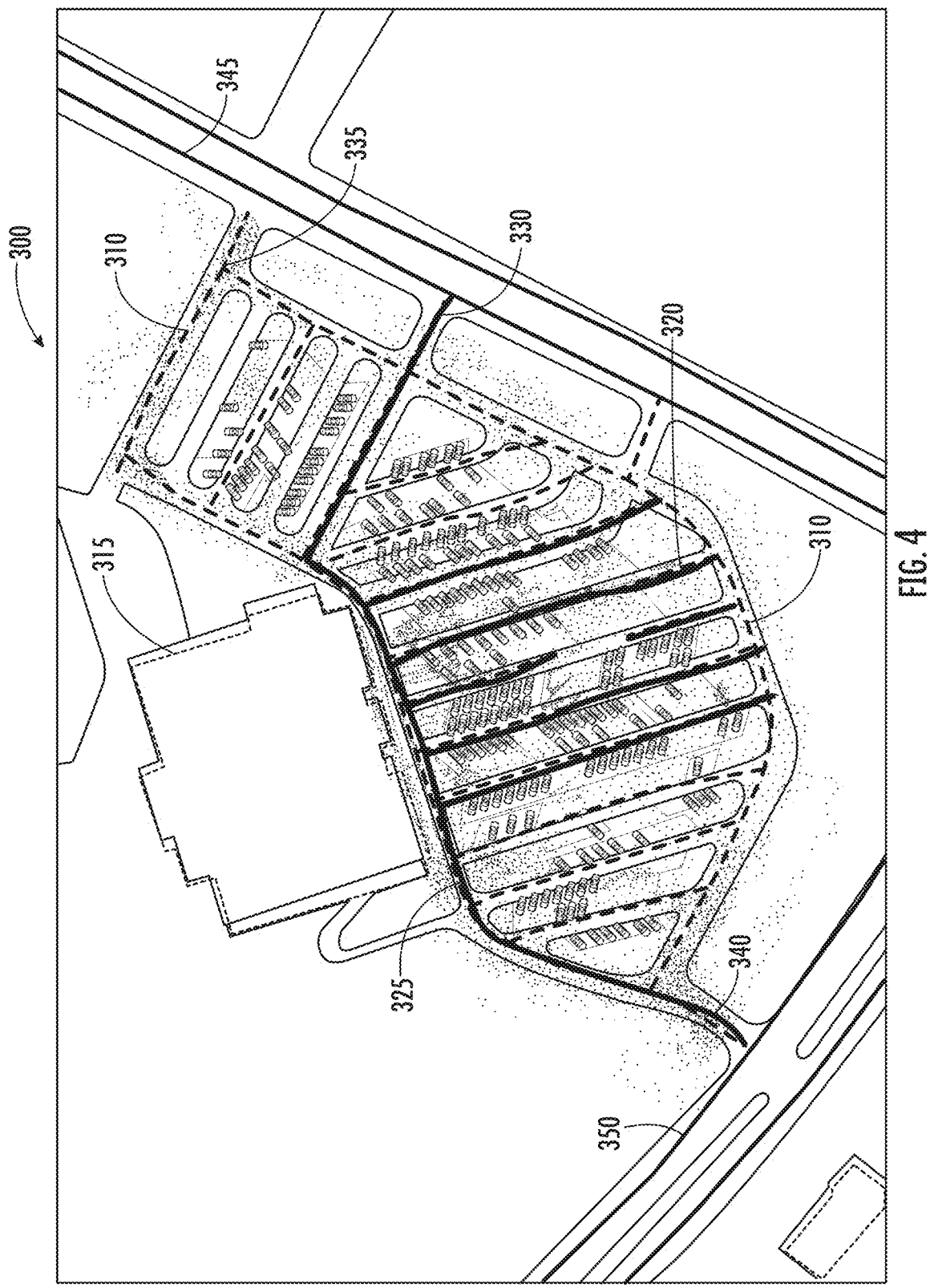
Figure 5:
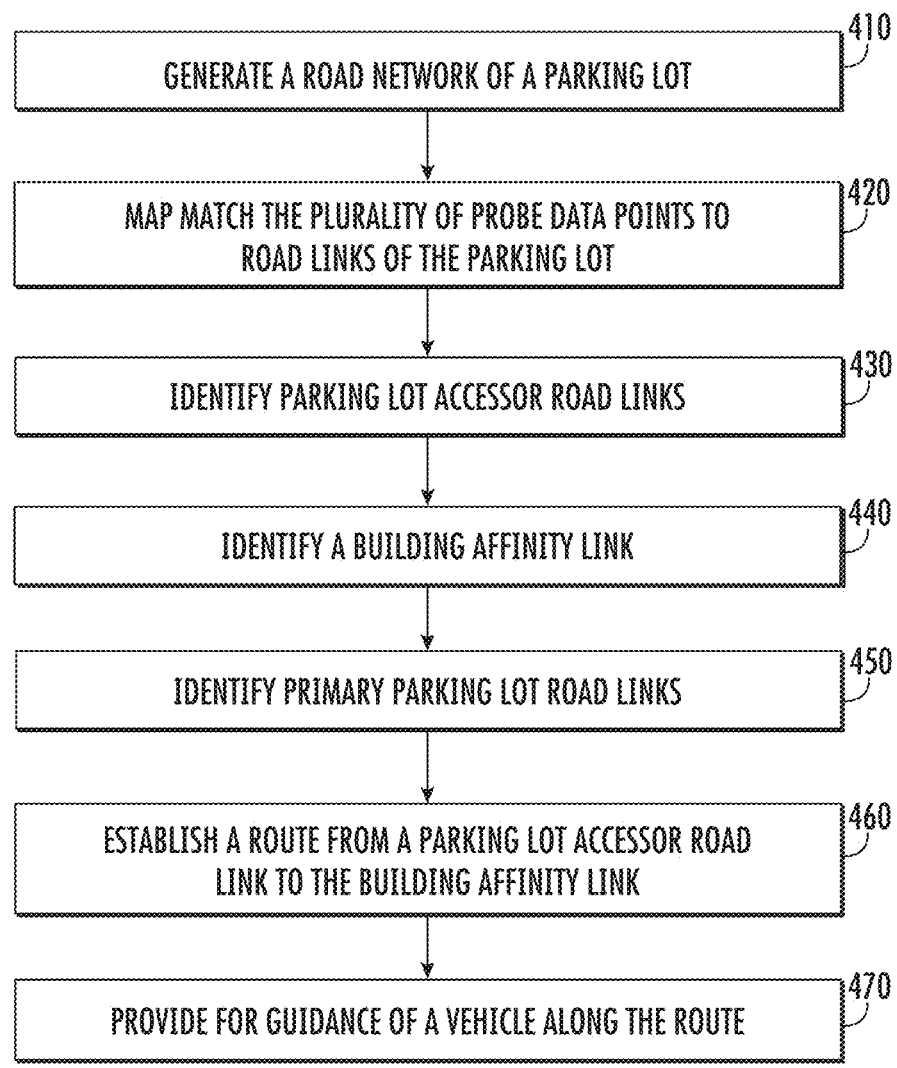

Having thus described example embodiments of the disclosure in general terms, reference will now be made to the accompanying drawings, which are not necessarily drawn to scale, and wherein:

FIG. 1 illustrates a block diagram of a system for creating parking lot geometry according to an example embodiment of the present disclosure;

FIG. 2 is a block diagram of an apparatus for creating parking lot geometry according to an example embodiment of the present disclosure;

FIG. 3 illustrates a parking lot proximate a building including an established parking lot road link geometry according to an example embodiment of the present disclosure;

FIG. 4 illustrates the parking lot of FIG. 3 with primary parking lot road links, parking lot accessors, and building affinity links identified according to an example embodiment of the present disclosure; and FIG. 5 is a flowchart of a method for generating routes through a parking lot according to an example embodiment of the present disclosure.

DETAILED DESCRIPTION

Example embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content,"

"information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

A system, method, apparatus, and computer program product are provided herein in accordance with an example embodiment for automatically creating two-dimensional (2D) and three-dimensional (3D) parking geometry from probe data that can be used to provide turn-by-turn navigation from a network of roads, through entrances to parking lots, and through parking lots to point-of-interest parking locations. Specifically, embodiments enable leaving the mapped road network and navigating through parking lots for which map data may not yet exist, and to reach points-of-interest through parking proximate the points-of-interest. FIG. 1 illustrates a communication diagram of an example embodiment of a system for implementing example embodiments described herein. The illustrated embodiment of FIG. 1 includes a map services provider system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and a network of a system operator. The processing server 102 may include the map database 108, such as provided by a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Additionally or alternatively, the user equipment 104 may be a fixed computing device, such as a personal computer, computer workstation, kiosk, office terminal computer or system, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map services provider 116.

The map database 108 may include node data, road segment data or link data, point of interest (POI) data, relational map object base (RMOB) geometry or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by user equipment 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map services provider. For example, a customer of the map services provider, such as a navigation services provider or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In certain embodiments, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. The probe data may also include speed and direction in some embodiments, such as when probe data is used to facilitate vehicle traffic speed determination. While probe data is described herein as being vehicle probe data, example embodiments may be implemented with pedestrian probe data, marine vehicle probe data, or non-motorized vehicle probe data (e.g., from bicycles, scooters, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present disclosure for generating map geometry of parking lots and parking areas proximate points-of-interest. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Embodiments described herein may use a network created from probe data to identify a sub-set of parking roads to use in order to reach points-of-interest, such as buildings. Embodiments employ optional building polygons or point-of-interest polygons and optional parking accessors to establish parking lot geometry and to provide guidance to vehicles through the derived geometry to find parking proximate a point-of-interest.

According to an example embodiment described herein, a routing technique may be used to route or guide a vehicle from an entry point of a parking lot to point-of-interest links proximate the point-of-interest for parking through the identification of major parking roads. Further, link probe density and trajectory count can be used to bias links to prioritize for routing. For example, when using a cost-based routing algorithm with the lower-cost route being desirable, where cost reflects measures of time (faster is less costly), turn maneuvers (fewer turns are less costly), and other metrics, the parking lot road links may include a smaller routing cost if they have a relatively high probe count (e.g., used by many vehicles), relatively high trajectory count (e.g., again suggesting use by many vehicles), or a relatively high probe speed (e.g., suggesting a primary road link). Further, routing may require traversal of point-of-interest affinity links which will be described further below.

While road network geometry information may be well-established and available from map services provider 116 from map database 108, the geometry of parking lots and road links within parking lots may not be well established. Further, navigation systems and autonomous vehicles may not provide guidance to a vehicle through parking lots due to a lack of available geometry. Embodiments provided herein generate parking lot geometry and provide a mechanism by which guidance, including navigation and autonomous vehicle control, can be provided through the parking lots with the generated geometry.

To generate parking lot geometry, an initial network of parking lot road links or parking links may be generated from vehicle probe data. Optionally, the parking lot road links may be identified in pre-existing relational object map base geometry which may be used in lieu of or in conjunction with the probe data for generating parking lot geometry. The vehicle probe data may be map matched to parking lot road links to establish the most driven roads based on probe density and number of trajectories. The average or median speed may also be computed for each link. If building footprints or point-of-interest locations are available, links that follow (e.g., are parallel to and/or close to) the building edges or point-of-interest locations are identified as "building affinity links." These building affinity links are candidate routing destinations from all of the parking lot accessor roads as they are desirable parking lot road links proximate the destination associated with the parking lots.

To identify the major parking roads, optimal routes are identified from each of the parking lot access roads or accessors to all of the building affinity links that constitute the point-of-interest routing destinations. An "optimal" route for a parking lot access road to a building affinity link can be based on a cost-based routing algorithm that may consider: route length; number of turns; link probe speed; link probe density; and link probe trajectory count. If no building footprints are available, points-of-interest can be used to identify building affinity links. If neither building footprints or points-of-interest are available to identify building affinity links, the routing algorithm may rely on identifying the most traveled links by probe density or trajectory count or a trajectory path-based map matcher can be employed.

FIG. 3 illustrates a map 300 of a geographic region that includes a parking lot of a building 315 which may be considered a point-of-interest. A road network is created including a plurality of parking lot road links 310 for the parking lot based on probe data 305 generated by probe devices traversing the parking lot. The parking lot road links 310 may optionally be generated from pre-existing road geometries. The probe data 305 is then map-matched to the parking lot road links 310 to determine the most driven roads based on at least one of probe density and number of trajectories. The average or median speed for each road link may also be computed from the probe data. Heading spread statistics can be computed since low variance in heading variance may be an indicator of a major parking road as compared to the parking lanes that have more noisy probe heading and thus larger variance.

The map matching process may use a static or dynamic link distance threshold (e.g., 2 to 15 meters) and a heading threshold (e.g., 15 degrees). Probe data outside of a distance of a threshold distance from a road link or segment is not map matched to the road link, and probe data having a heading that is more than 15 degrees away from a heading of a road link may not be map matched to the road link. This filters out probe data that may be erroneous and restricts the map-matched probe data to data that is likely to be traffic along the particular parking lot road link. The map matcher may be point-based (location) or trajectory-based (heading). The thresholds for map matching may be static or dynamic and may depend on the noise level in the probe data and/or on the intersection geometry.

FIG. 4 illustrates an example embodiment in which the parking lot road links 310 are classified or weighted based on how frequently they are driven. According to the illustrated embodiment, the road links shown in heavier line weights are more driven parking lot road links. For example, road link 320 appears to be the most frequently driven parking lot road link along which parking exists, while road link 325 appears frequently driven likely due to the proximity to the building footprint 315. The more frequently traversed parking lot road links may be established as primary parking lot road links, where primary parking lot road links include at least one of a trajectory count, probe count, or average or median probe speed that is higher than a respective trajectory count, probe count, or average or median probe speed of non-primary parking lot road links. This establishes primary parking lot road links as those more heavily traversed than other parking lot road links, thereby rendering them more desirable for routing.

According to example embodiments, parking lots may not include identified points-of-interest or buildings proximate to the parking lots. However, according to embodiments in which building footprints or point-of-interest locations are available, links that follow (e.g., are parallel to and close to) the building edges or point-of-interest locations may be identified as "building affinity links". According to the example embodiment of FIG. 4, road link 325 may be established as a building affinity link. These building affinity links are candidate routing destinations for guidance of a vehicle through the parking lot from parking lot accessor roads, such as road segments 330, 335, and 340 of FIG. 4.

In addition to building affinity links, building accessors may be identified. For example, entrances and exits to a building may be identified for the footprint of a building based on probe data from mobile devices entering and exiting the building. These building accessors can optionally be used as destinations for routes or to inform a routing algorithm with regard to parking lot road links situated closest to the building accessors. Optionally building accessors may be used as pick-up points for use as a destination for routing when guiding an autonomous vehicle from a parking location to a pick-up location.

The parking lot accessor roads are identified as routing start points when available. Parking lot accessor roads are identified as parking lot road links that connect from the parking lot to road segments of the road network, such as road segments 345 and 350 of FIG. 4. If parking accessors are not available, parking lot accessor roads may be identified as parking lot road links extending into or out of the parking lot with statistically high probe traffic (e.g., based on probe count or trajectory count).

Based on the identified parking lot road links, including the parking accessors 330, 335, 340, the most frequently traveled parking lot road links 320, 325, among others, and the building accessor link(s) 325, a device seeking a route to a destination including the building 315 may be routed from its origin via a parking accessor to the building 315. A route from an origin to the building 315 or point-of-interest can be established using available routing techniques. An "optimal" route for a vehicle from a parking accessor link to the building affinity link 325 may be based on a cost-based routing algorithm that considers one or more of: route length, number of turns, link probe speed, link probe density, link probe trajectory count, or heading variance. According to such an embodiment, the longer the route length, the higher the relative cost of the route. The higher the number of turns, the higher the relative cost of the route. The lower the link probe speed, the higher the relative cost of the route (e.g., it is a faster route). The higher the link probe density or link probe trajectory count, the lower the relative cost of the route (e.g., it is a commonly traversed route). The lower the heading variance, the lower the relative cost of the route. Heading variance may optionally be used to distinguish primary parking lot road links from non-primary parking lot road links. For example, a heading variance below a predefined threshold may indicate a primary parking lot road link, while a heading variance above the predefined threshold may be a non-primary parking lot road link.

Primary parking lot road links may be established based on heading density, probe density, heading variance, parking lot road link average or median speed, or some combination thereof. For example, a heavily traveled parking lot road link that has a very low average or median speed may not be a primary parking lot road link due to a propensity for congestion. Various combinations of properties of the road links may contribute to whether they are established as primary parking lot road links or not. Further, the distinction of primary versus non-primary parking lot road links may be dynamically adjusted periodically. For example, parking lot road links around a shopping mall may have certain properties during most of the year, while around December holidays, the properties may change significantly. These dynamically changing properties of parking lot road segments may be used to establish the lowest cost routing through the parking lots to or from building affinity links, thereby providing an improved user experience to avoid undesirable routes and provide the best route available for the given time and properties of the parking lot.

According to some example embodiments, building footprints or point-of-interests may not be available for the identification of a building affinity link. In such an embodiment, the routing algorithm may rely on identifying the most traveled parking lot road links based on probe density or trajectory count, and the most traveled parking lot road links may be established as the candidate destinations for the route through the parking lot. Optionally, a trajectory path-based map matcher can be employed. According to the illustrated embodiment of FIG. 4, various routes may be taken to reach the candidate destination of the building affinity link 325. Depending upon where the vehicle approaches the parking lot from, the appropriate parking lot accessor may be chosen from 330, 335, and 340. The routing algorithm may provide guidance to the building affinity link 325, and parking lot road link 320 may be identified as the primary option for parking proximate the building affinity link.

Establishing a route from a parking lot accessor road link to the building affinity link may include establishing the route based on a routing algorithm as described above. This route may be provided for guidance of a vehicle along the route. This guidance may be in the form of navigational assistance, whereby a driver is guided along the various road links of the parking lot to their destination for parking their vehicle. However, further embodiments may include use of the route by the ADAS to provide semi-autonomous or fully-autonomous control of the vehicle such that providing guidance of the vehicle includes guiding an autonomous vehicle or semi-autonomous features of a vehicle along the established route to the destination. Embodiments described herein may use the established parking lot geometry for routing of a vehicle from a parking space to a pick-up location, particularly when the vehicle is an autonomously controlled vehicle. A user may summon a vehicle in a manner similar to that of a valet, where the user provides a command to an ADAS for the vehicle to move under autonomous control from a parking space to the pick up location of the user. This pick up location may be along the building affinity link, for example.

FIG. 5 illustrates a flowchart depicting methods according to example embodiments of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present disclosure and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 5 illustrates a flowchart of a method according to an example embodiment of the present disclosure for the creation of parking lot geometry that can be used to provide guidance to a vehicle through the parking lot, and more particularly, to the automatic creation of parking lot geometry to enable guidance of vehicles to and from parking located proximate points-of-interest. As shown at 410, a road network of a parking lot may be generated based on a plurality of probe data points. The plurality of probe data points are map-matched to the road links of the parking lot at 420. Parking lot accessor road links are identified at 430, while a building affinity link is identified at 440. Primary parking lot road links are identified at 450, where primary parking lot road links include at least one of a trajectory count, probe count, or average or median probe speed that is higher than a respective trajectory count, probe count, or average or median probe speed of non-primary parking lot road links. At 460, a route from a parking lot accessor road link to the building affinity link is established, where the route that is established is based on a cost-based routing algorithm in which primary parking lot road links are of a lower cost than non-primary parking lot road links; and provide for guidance of a vehicle along the route. At 470, guidance is provided for a vehicle along the route, where guidance may range from navigational assistance to a driver of a vehicle to fully autonomous control of a vehicle along the route using an ADAS.

In an example embodiment, an apparatus for performing the methods of FIG. 5 above may include a processor (e.g., the processor 202) configured to perform some or each of the operations (410-470) described above. The processor may, for example, be configured to perform the operations (410-470) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-470 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
    generate a road network of a parking lot based on a plurality of probe data points;
    map match the plurality of probe data points to road links of the parking lot;
    identify parking lot accessor road links;
    identify a building affinity link;
    identify primary parking lot road links, wherein primary parking lot road links comprise at least one of a trajectory count, probe count, or average or median probe speed that is higher than a respective trajectory count, probe count, or average or median probe speed of non-primary parking lot road links;
    establish a route from a parking lot accessor road link to the building affinity link, wherein the route that is established is based on reducing route cost using a cost-based routing algorithm in which primary parking lot road links are of a lower cost than non-primary parking lot road links, and where the route cost reflects at least one of route length, duration of route, number of turn maneuvers along the route, or probe speed along the route; and
    provide for guidance of a vehicle along the route.

2. The apparatus of claim 1, wherein causing the apparatus to map match the plurality of probe data points to road links of the parking lot comprises causing the apparatus to: map match the plurality of probe data points to road links of the parking lot based on at least one of probe density or a number of trajectories.

3. The apparatus of claim 1, wherein inputs to the cost-based routing algorithm comprise one or more of route length, number of turns, link probe speed, link probe density, link probe trajectory count, or heading variance.

4. The apparatus of claim 1, wherein the apparatus is further caused to calculate a heading spread of trajectories along the parking lot road links, and wherein causing the apparatus to identify primary parking lot road links comprises causing the apparatus to identify primary parking lot road links as having a low heading variance relative to non-primary parking lot road links.

5. The apparatus of claim 1, wherein causing the apparatus to identify the building affinity link comprises causing the apparatus to:
    identify at least one of a building footprint or a point-of-interest location;
    determine the building affinity link as a road link of the parking lot proximate the at least one of the building footprint or the point-of-interest location; and
    establish the building affinity link as a routing destination for the at least one of the building footprint or the point-of-interest location.

6. The apparatus of claim 1, wherein causing the apparatus to provide for guidance of the vehicle along the route comprises causing the apparatus to:
    provide autonomous vehicle control of the vehicle along the route.

7. The apparatus of claim 1, wherein the apparatus is further caused to:
    establish a route from a parking location to a pick-up location; and
    provide autonomous vehicle control of the vehicle from the parking location to the pick-up location.

8. The apparatus of claim 1, wherein the apparatus is further caused to store the road network of the parking lot in a map database.

9. A computer program product comprising at least one non-transitory computer-readable storage medium having computer-executable program code instructions stored therein, the computer-executable program code instructions comprising program code instructions to:
    generate a road network of a parking lot based on a plurality of probe data points;
    map match the plurality of probe data points to road links of the parking lot;
    identify parking lot accessor road links;
    identify a building affinity link;
    identify primary parking lot road links, wherein primary parking lot road links comprise at least one of a trajectory count, probe count, or average or median probe speed that is higher than a respective trajectory count, probe count, or average or median probe speed of non-primary parking lot road links;
    establish a route from a parking lot accessor road link to the building affinity link, wherein the route that is established is based on reducing route cost using a cost-based routing algorithm in which primary parking lot road links are of a lower cost than non-primary parking lot road links, and where the route cost reflects at least one of route length, duration of route, number of turn maneuvers along the route, or probe speed along the route; and provide for guidance of a vehicle along the route.

10. The computer program product of claim 9, wherein the program code instructions to map match the plurality of probe data points to road links of the parking lot comprise program code instructions to: map match the plurality of probe data points to road links of the parking lot based on at least one of probe density or a number of trajectories.

11. The computer program product of claim 9, wherein inputs to the cost-based routing algorithm comprise one or more of route length, number of turns, link probe speed, link probe density, link probe trajectory count, or heading variance.

12. The computer program product of claim 9, further comprising program code instructions to calculate a heading spread of trajectories along the parking lot road links, wherein the program code instructions to identify primary parking lot road links further comprise program code instructions to identify primary parking lot road links as having a low heading variance relative to non-primary parking lot road links.

13. The computer program product of claim 9, wherein the program code instructions to identify the building affinity link comprise program code instructions to:
identify at least one of a building footprint or a point-of-interest location;
determine the building affinity link as a road link of the parking lot proximate the at least one of the building footprint or the point-of-interest location; and
establish the building affinity link as a routing destination for the at least one of the building footprint or the point-of-interest location.

14. The computer program product of claim 9, wherein the program code instructions to provide for guidance of the vehicle along the route comprise program code instructions to:
provide autonomous vehicle control of the vehicle along the route.

15. The computer program product of claim 9, further comprising program code instructions to:
establish a route from a parking location to a pick-up location; and
provide autonomous vehicle control of the vehicle from the parking location to the pick-up location.

16. The computer program product of claim 9, further comprising program code instructions to store the road network of the parking lot in a map database.

17. A method comprising:
generating a road network of a parking lot based on a plurality of probe data points;
map matching the plurality of probe data points to road links of the parking lot;
identifying parking lot accessor road links;
identifying a building affinity link;
identifying primary parking lot road links, wherein primary parking lot road links comprise at least one of a trajectory count, probe count, or average or median probe speed that is higher than a respective trajectory count, probe count, or average or median probe speed of non-primary parking lot road links;
establishing a route from a parking lot accessor road link to the building affinity link, wherein the route that is established is based on reducing route cost using a cost-based routing algorithm in which primary parking lot road links are of a lower cost than non-primary parking lot road links, and where the route cost reflects at least one of route length, duration of route, number of turn maneuvers along the route, or probe speed along the route; and
providing for guidance of a vehicle along the route.

18. The method of claim 17, wherein map matching the plurality of probe data points to road links of the parking lot comprises: map matching the plurality of probe data points to road links of the parking lot based on at least one of probe density or a number of trajectories.

19. The method of claim 17, wherein inputs to the cost-based routing algorithm comprise one or more of route length, number of turns, link probe speed, link probe density, link probe trajectory count, or heading variance.

20. The method of claim 17, further comprising calculating a heading spread of trajectories along the parking lot road links, wherein identifying primary parking lot road links comprises identifying primary parking lot road links as having a low heading variance relative to non-primary parking lot road links.

21. The method of claim 17, wherein identifying the building affinity link comprises:
identifying at least one of a building footprint or a point-of-interest location;
determining the building affinity link as a road link of the parking lot proximate the at least one of the building footprint or the point-of-interest location; and
establishing the building affinity link as a routing destination for the at least one of the building footprint or the point-of-interest location.

22. The method of claim 17, wherein providing for guidance of the vehicle along the route comprises providing autonomous vehicle control of the vehicle along the route.

\* \* \* \* \*